Oct. 20, 1970  P. E. THOMA ET AL  3,534,608
CROSSLINKED LOOP HUMIDITY SENSING ELEMENT
AND METHOD OF MAKING THE SAME
Filed Jan. 15, 1968
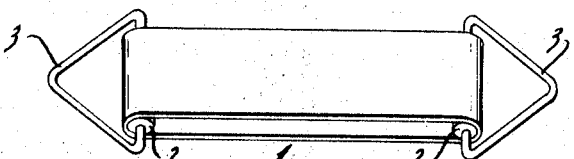
FIG_1
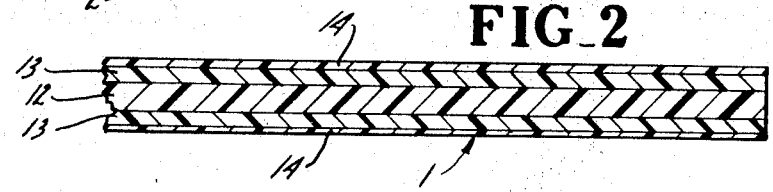
FIG_2
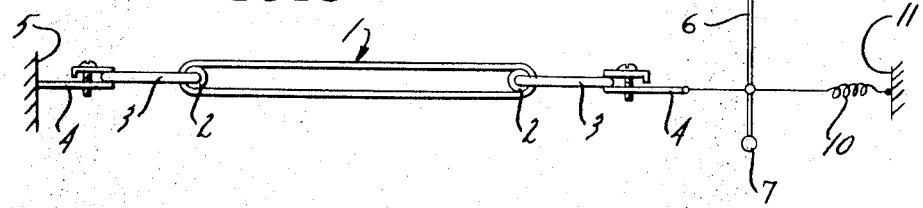
FIG_3
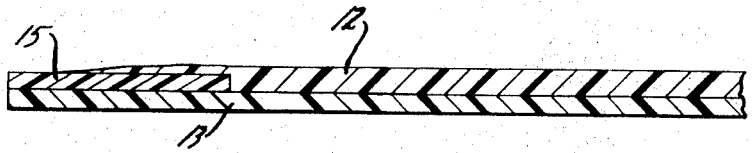
FIG_4
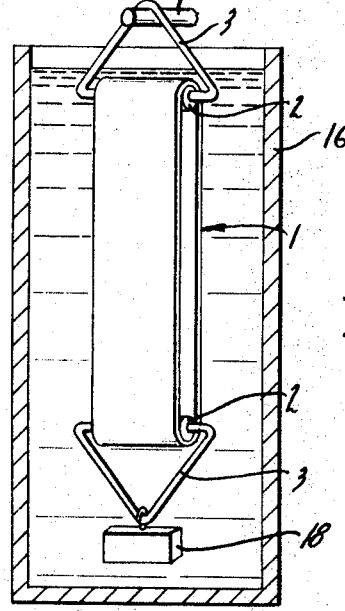
FIG_5
INVENTOR.
PAUL E. THOMA
JEANNINE O. COLLA
BY
Andrus & Starke
Attorneys … # 3,534,608
CROSSLINKED LOOP HUMIDITY SENSING ELEMENT AND METHOD OF MAKING THE SAME Paul E. Thoma and Jeannine O. Colla, Milwaukee, Wis., assignors to Johnson Service Company, Milwaukee, Wis., a corporation of Wisconsin
Filed Jan. 15, 1968, Ser. No. 697,998
Int. Cl. G01n 19/10
U.S. Cl. 73—337.5                                                                15 Claims

ABSTRACT OF THE DISCLOSURE

The invention relates to a variable dimension, elongated loop humidity sensing element and to a method of making the element. The element comprises an organic crosslinked core and outer layers of a moisture sensitive, either uncrosslinked or partially crosslinked, material are bonded to opposite surfaces of the core. The element is fabricated by forming a three-layer laminate in strip form with the core material being spaced from the ends of the strip. The free ends of the strip are bonded together by use of a solvent to provide a loop configuration and mounting brackets are connected to opposite portions of the looped element. Subsequently, the element, while stressed in tension, subjected to a hydrolyzing treatment which provides a highly moisture sensitive outer surface for the element as well as providing a permanent elongated set for the loop.

---

A mechanical type of humidity sensing element utilizes the dimensional change which occurs in the humidity sensing material when there is a change in relative humidity to either indicate the relative humidity or to actuate a humidity control system.

The copending patent application, Ser. No. 671,067, filed Sept. 27, 1967 entitled Humidity Sensing Element now Pat. No. 3,440,881, describes a synthetic, varying dimension, humidity sensing element which has improved resistance to creep and improved chemical resistance. The humidity sensing element of the aforesaid patent application includes a core or base formed of an organic, crosslinked material and having moisture sensitive organic layers bonded to one or both surfaces of the core. The material of the outer layers can be uncrosslinked or can be in a partially crosslinked condition. If the outer layer is bonded to only one surface of the core, the element is employed as a cantilever type, in which the element is supported from one end only and deflection of the element, due to humidity changes, can be used to either indicate the humidity or to control a humidity system. If the moisture sensitive outer layer is applied to opposite surfaces of the core, the element will expand and contract linearly, and the element is used in the form of a strip or endless loop. With this form, the element is clamped at both ends and subjected to a light tension stress. Changes in humidity will cause linear changes in dimension of the element and the changes in dimension will act to indicate the humidity directly or to actuate a humidity control system.

The present invention is directed to a variable dimension humidity sensing element having a loop configuration and to a method of fabricating the element. The element itself is formed of a material similar to that described in the copending application Ser. No. 671,067, filed Sept. 27, 1967, and includes a core or base formed of a crosslinked organic material. Bonded to at least one surface of the core is a moisture sensitive uncrosslinked, or partially crosslinked outer layer.

The loop element of the invention is fabricated by initially casting a solvent solution of one of the outer surface layer materials on a flat surface and on evaporation of the solvent, masking strips are placed across the end portions of the dried first outer layer. A solvent solution of the core material is then cast over the first layer and the masking strips are removed before the solvent has completely evaporated. Following this, a solvent solution of the second outer layer is cast over the dried core as well as over the dry, previously masked area. On evaporation of the solvent, an integral three-layer, laminated film is obtained.

To crosslink the material of the core, the film is heated to an elevated temperature sufficient to achieve the crosslinked reaction. Subsequently, the film is cut into strips and the free ends of the strip, which do not contain any core material, are placed in overlapping relation and bonded together by use of a solvent to provide a loop configuration for the element.

Mounting brackets are attached to opposite portions of the loop and the loop element is then subjected to a hydrolyzing treatment while subjected to tensile stress, which hydrolyzes the outer surface of each of the moisture sensitive layers, thereby providing highly moisture sensitive outer surfaces. The temperature employed during the hydrolyzing treatment also causes the loop to take a permanent elongated shape, thereby decreasing the length of time required for the loop to take a permanent set when installed in an instrument.

The crosslinked core of the loop element provides resistance to creep when the element is subjected to stress in service, while the outer layers provide toughness for the element, making the element less brittle than an element composed entirely of a crosslinked material.

Due to the crosslinking, the element of the invention has improved thermal stability and chemical resistance and therefore can be washed or treated with commercial solvents or detergent solutions without danger of destroying the performance of the element. Due to the fact that the moisture sensitive layer is on both surfaces of the endless loop, four moisture sensitive contact areas are provided, thereby increasing the response rate to humidity conditions over that of the conventional type of element.

As the element is a synthetic product, it can be fabricated under controlled conditions and therefore requires less calibration from element-to-element.

Other objects and advantages will appear in the course of the following description.

The drawings illustrate the best mode presently contemplated of carrying out the invention.

In the drawings:

FIG. 1 is a perspective view of the humidity sensing element in the form of a loop;

FIG. 2 is an enlarged transverse section of the element;

FIG. 3 is a diagrammatic view showing the use of the element in a mechanical type humidity control system;

FIG. 4 is an enlarged longitudinal section of the element after casting of the core material on the first outer layer; and FIG. 5 is a schematic view showing the loop element immersed in the hydrolyzing bath.

FIG. 1 illustrates a humidity sensing element 1 in the form of an endless loop which is supported in tension on rollers or supports 2. A mounting bracket 3 is attached to each of the rollers 2, and as shown in FIG. 3, a clamp 4 serves to connect one of the mounting brackets 3 with a fixed support 5.

A second clamp 4 is connected to the opposite mounting bracket 3 and the clamp is connected to a pointer 6 which is mounted for pivotal movement about point 7. The tip 8 of the pointer 6 is adapted to move over a scale 9 to thereby provide relative humidity readings on the calibrated scale.

The element 1 is held under tension by a spring 10 attached to the fixed support 11. With this arrangement, linear movement of the element 1 will pivot the pointer about the pivot point 7 to thereby provide a reading of the relative humidity on the calibrated scale 9.

The loop element 1 is composed of a central core or base 12, and outer layers 13 of a moisture sensitive material are integrally bonded to opposite surfaces of the core, as shown in FIG. 2.

The core 12 is a substantially fully crosslinked reaction product formed by the reaction of a compound containing glucoside chains, such as a cellulosic material, and a stabilizing monomer capable of reacting with the hydroxyl groups of the glycoside. For example, the reactant can be cellulose or a cellulose ester in which the esterifying acids contain up to 20 carbon atoms and preferably up to 6 carbon atoms. Specific examples are cellulose triacetate, cellulose, butyrate, cellulose propionate, cellulose succinate, cellulose phthalate or the like. Cellulose nitrate can also be used as well as mixed cellulose esters such as cellulose acetate-butyrate and cellulose acetate-propionate. Cellulose ethers in which the etherifying alcohol containing up to 8 carbon atoms, such as ethyl cellulose, methyl cellulose, hydroxypropylmethylcellulose, and hydroxybutylmethylcellulose can also be employed.

The stabilizing reactant which is crosslinked with the glucoside-containing compound can take the form of monomers or partial polymers of urea-formaldehyde, phenol-formaldehyde, melamine-formaldehyde, triazine-formaldehyde, hexamethoxymethylmelamine, glyoxal, 2-hydroxyadipaldhyde and the like.

The amount of the stabilizing monomer to be used in conjunction with the glucoside derivative can vary depending on the nature of the monomer. In the case of a resin which will crosslink with itself such as urea-formaldehyde, the monomer or partial polymer can vary within wide limits. Any excess of the monomer, over and above that which will react and crosslink with the glucoside will crosslink with itself. However, the stabilizing monomer should react with at least about 1% of the available hydroxyl groups of the glucosides and preferably with substantially all the available hydroxyl groups. With a stabilizing monomer or partial polymer that will not crosslink with itself, such as hexamethoxymethylmelamine, the monomer should be used in a stoichiometric amount with the glucoside derivative or cellulosic material, or slightly less than a stoichiometric amount, for any excess will tend to act as a plasticizer for the core 12 and thereby increase the creep of the element.

To accelerate the crosslinking reaction, a catalyst is usually added to the reaction mixture. Any conventional catalyst for the particular monomers or partial polymers being employed can be used. For example, catalysts to be used with urea-formaldehyde, phenol-formaldehyde and melamine-formaldehyde monomers include trifluoroacetic acid, methanesulfonic acid, monobutyl acid orthophosphate, n-butyl acid phosphate, p-toluenesulfonic acid, and the like.

In addition to the catalyst, it may also be desirable in many instances to employ a catalyst stabilizer which serves to tie up the catalyst until the crosslinking reaction is desired to occur. The catalyst stabilizers are conventional materials and include epoxide monomers and triethylamine, 2-dimethylaminoethanol, 2-diethylaminoethanol, and other volatile organic amines having boiling points below 250° C. The epoxide monomers can be used as both a catalyst stabilizer and as a reactant in the crosslinking reaction.

The outer layers 13 are preferably formed of a non-crosslinked compound containing glucoside chains, such as cellulose, a cellulose ester, or a cellulose ether. With the use of cellulose esters, the esterifying acids contain up to 20 carbon atoms and preferably up to 6 carbon atoms. Specific examples of cellulose esters are cellulose triacetate, cellulose butyrate, cellulose propionate, cellulose succinate, cellulose phthalate, cellulose acetate-butyrate, cellulose acetate-propionate, and the like. Cellulose nitrate can also be utilized.

When using cellulose ethers, the etherifying alcohol contains up to 8 carbon atoms and specific examples are ethyl cellulose, methyl cellulose, hydroxypropylmethylcellulose, hydroxybutylmethylcellulose and the like.

In some cases, the outer layers 13 can be formed of the partially crosslinked reaction product of a compound containing glucoside chains and a monomer or partial polymer capable of reacting with the hydroxyl groups of the glucoside. If the glucoside-containing compound of the outer layers 13 is partially crosslinked, the stabilizing reactant can take the form of monomers or partial polymers similar to those described in connection with the formation of the core 12. The amount of the stabilizing monomer to be used in conjunction with the glucoside derivative can vary, but it is important that only a partial crosslinking be obtained in order that the outer layers 13 will be flexible and tough. Thus, the amount of monomer to be used should be less than the stoichiometric amount required to completely crosslink with the hydroxyl groups of the glucoside. It is preferred that the crosslinking monomer or partial polymer be used in an amount such that less than 50% of the hydroxyl groups of the glucoside will be tied up by the crosslinking reaction.

As discussed with the formation of the core 12, a catalyst is usually added to the crosslinking reaction mixture and in some instances it may be desirable to also add a catalyst stabilizer such as that previously described.

The outer layers 13, whether non-crosslinked or partially crosslinked, should have a moisture sensitivity such that the outer layer will show a dimensional increase of at least 1%, and preferably 1½% to 7%, with a change from 0% to 100% humidity. These sensitivity values are based on the outer layer dissociated from the core and need be in only one direction. In some cases the core 12 will be less moisture sensitive than the outer layers 13, while in other instances the core can have substantially the same moisture sensitivity as the outer layers or greater moisture sensitivity than the outer layers.

The thickness of the core 12 has a definite relation to the thickness of the outer layers 13. If a relatively moisture insensitive core is used and is too thick with respect to the thickness of the outer layers, the outer layers cannot provide the necessary dimensional change under changes in atmospheric moisture to deform the core. For an element having normal response, the thickness of the core will generally be in the range of about 0.1 to 5 mils, while the thickness of the outer layers 13 will be less than about 3 mils and should generally be between 10 to 400% of the thickness of the core 12. However, this relationship can vary depending on the moisture sensitivity and the modulus of elasticity of the outer layers 13 and core 12 and the response desired. The optimum thickness ratio of the outer surface layer with respect to the core 12 is generally arrived at experimentally.

As shown in FIGS. 1 and 2, the moisture sensitive layers 13 are bonded to opposite surfaces of the core 12. However, it is contemplated that in some cases the moisture sensitive layer need only be applied to one surface of the core 12. However, applying the moisture sensitive layers 13 to opposite surfaces of the core, has an advantage in that it increases the overall surface area of the moisture sensitive material and thereby improves the response of the element.

The sensitivity of the humidity sensing element can be further increased by hydrolyzing the outer surface of the cellulosic outer layer 13 to regenerate cellulose. The cellulosic outer layer 13 can be subjected to the influence of either an alkaline or an acid medium to hydrolyze substantially all of the acid radicals in the surface layer to thereby obtain a regenerated cellulose film 14 which provides maximum moisture sensitivity. The hydrolyzation can be accomplished by dipping the element into an alkaline or acid bath and maintaining it in the bath for a period of time sufficient to hydrolyze the acid groups on the surface of the outer layers 13. Alkaline materials which can be employed for the hydrolyzation are aqueous or alcoholic solutions of alkali metal bases, such as sodium hydroxide, potassium hydroxide, or lithium hydroxide. Alternately, alcoholic solutions of strong organic bases, such as tetramethylguanidine, trimethylamine, or benzyltrimethylammonium hydroxide can be used for the hydrolyzing action.

Hot alkaline solutions are preferred to increase the reaction rate. The time of contact or immersion in the alkaline solution depends, of course, on the material used, the temperature, and strength of the solution. For example, a two-hour hydrolysis period, using a 5% sodium hydroxide solution, was required to hydrolyze a mixed cellulose ester outer layer 13 to obtain the desired high sensitivity. By increasing the strength of the solution to 50%, an almost immediate hydrolyzation occurred. The most effective reaction conditions were found to be obtained by immersing the element in 230° F., 40% sodium hydroxide solution for 1 to 4 minutes, depending on the desired layer thickness of the hydrolyzed layer 14.

After the hydrolyzation, the element is preferably rinsed in water to remove and dilute the alkaline residue.

Solutions of mineral acids, such as hydrochloric acid and sulphuric acid, can also be used to hydrolyze the cellulosic outer layer 13. However, the use of alkaline material provides a faster hydrolyzation and is preferred.

To prepare the loop humidity sensing element of the invention, the components of the core 12, as well as the components of the outer layers 13, are separately dissolved in a volatile solvent to provide solvent solutions. Solvents such as acetone, ethyl acetate, ethylmethylketone, butyl alcohol, methylene chloride, nitroethane, cyclohexanone, ethylene dichloride, methylisobutylketone, isobutyl acetate, hexane, toluene, diethyl ether, water, ethyl alcohol, xylene, isopropyl alcohol, or the like can be used.

Specific examples of solvent solution formulations for both the core 12 and outer layers 13, which can be utilized, are shown in the copending patent application Ser. No. 671,067, filed Sept. 27, 1967.

In preparing the element, the solvent solution of one of the outer layers 13 is initially cast on a clean glass plate with a strike-off bar. After the solvent is evaporated from the first layer, areas at the ends of the cast film are masked with a solvent-resistant tape 15, such as Mystik tape #7331 (polyester tape with silicone adhesive).

The solvent solution of the core material, containing the glucoside compound, the stabilizing monomer, along with the catalyst and catalyst stabilizer, is then cast over the first dried layer as shown in FIG. 4. It is preferred that the solution of the core material be colored so that the area to which the core material is applied will be readily visible. The masking tape 15 is then removed preferably, before the solvent of the core solution has completely evaporated. Bonding of the core to the first moisture sensitive layer will be achieved as the solvents in the core solution will partially dissolve the first humidity sensing layer and if the components in these two layers are compatible. It is preferred to remove the masking tape 15 before the solvent of the core material has completely evaporated because if the masking tape is maintained in position until the solvent of the core material is completely evaporated, a ridge is formed at the juncture with the tape and, during service, stress concentrations may occur along this ridge. The solvent solution of the core material is relatively viscous and will not flow across the previously masked area after the masking tape is removed.

When the core layer 12 has dried, a second humidity sensitive layer is cast as a solvent solution over the two-layer film on the glass plate, using the strike-off bar. Bonding between the core layer and the second humidity sensitive layer 13 will result if the solvents in the humidity sensitive layer solution partially dissolve the core layer and if the compounds in the two layers are compatible. The solvents are then allowed to evaporate from the second moisture sensitive layer.

After the three-layer film is dry, the core 12, and in some cases the moisture sensitive layers 13, are polymerized or crosslinked by heating the laminated film on the glass plate to a temperature in the range of 200 to 400° F., and preferably 250 to 375° F., for a period of time sufficient to crosslink the stabilizing monomer or partial polymer with the hydroxyl groups of the glucoside chains.

While the crosslinking reaction can be made to occur at room temperature with most formulations, better results are obtained when the reaction is carried out at an elevated temperature.

Following the crosslinking, the three-layer film is cut into strips and the strips are released from the glass plate by passing cold water over the cut film. After drying of the strips, the ends are trimmed so that approximately ⅛ inch of film with no crosslinked core layer 12 is remaining on both free ends of the strip.

The free ends of the strip are then folded around so that the ends with no crosslinked core are in a position to form a lapped joint. A process of solvent bonding is carried out, that is, a weak solution of solvent of the lap joint material, such as a 50/50 mixture of ethyl alcohol and diacetone alcohol, is applied to the lapping surfaces and the lapping surfaces are pressed together to form a bond between the surfaces on evaporation of the solvent.

The reason that the core material is eliminated in the overlapping end portions, is that during casting of the various layers the core materials will tend to diffuse into the outer layers so that some crosslinking will occur in the outer layers. As the crosslinked materials are infusible and cannot generally be dissolved by the solvents employed in bonding the overlapping end portions, a relatively weak bond may result if the core material is located in the overlapping end portions.

The rollers 2 and brackets 3 are then assembled with the circular loop and the element is then immersed in a tank or bath 16 containing a hydrolyzing solution. As shown in FIG. 5, one bracket 3 is supported on a rod 17, and a weight 18 is applied to the lower bracket. The effect of the hydrolyzing is twofold. The hydrolyzing increases and controls the humidity sensing characteristics of the crosslinked element and the temperature used in the hydrolyzing treatment causes the loop to take a permanent elongated set and thereby decreases the length of time necessary for the loop to take a permanent set when installed in an instrument.

After hydrolyzing, the loop element is rinsed in hot water and dried. The resulting crosslinked, looped humidity sensing element can then be employed in a mechanical-type humidity sensing apparatus such as that shown in FIG. 3, or in a conventional electrical-type apparatus.

By utilizing different colors for the core 12 and the outer layers 13, the areas at the free ends of the film, which are free of the crosslinked core material, are readily visible and this facilitates the bonding operation to provide the looped configuration. Following the formation of the loop, the bonded area will have a different color than the remainder of the element and normally the area of the bond will be positioned in contact with one of the rollers 2 so that the bonded area, which does not include the core 12, will not adversely affect the performance of the element.

The humidity sensing element of the invention has an improved rate of response to humidity conditions due to the fact that there are, in effect, four surfaces of moisture sensitive material exposed to the ambient conditions.

The loop element can be readily mounted in a humidity indicating or control system and is capable of withstanding considerable stress or tension during service. Due to the crosslinked core, and in some cases the partial crosslinking of the outer moisture sensitive layers, the element has improved resistance to creep and will thereby retain its set point in sensitivity to humidity changes throughout substantial periods of service without need for calibration.

The outer layers 13, which are not fully crosslinked, provide an improved degree of sensitivity as well as toughness for the element enabling it to be subjected to substantial tensile stress during service without cracking or fracturing.

The sensitivity of the element can be improved by hydrolyzing the outer surface of the moisture sensitive layers. As a further advantage, the hydrolyzation, which is carried out at an elevated temperature, provides the looped element with a permanent set thereby increasing the reliability of the element due to the fact that the element will not change its configuration after being installed in an instrument.

We claim:

1. In a method of preparing a looped humidity sensing element, the steps of forming a first layer of a moisture sensitive material, bonding a second layer of an organic crosslinkable material to a surface of said first layer with said second layer being spaced from the ends of the first layer to provide end portions free of said second layer, bonding a third layer of moisture sensitive material to said second layer and to said end portions of said first layer to provide a three-layer laminate, subjecting the laminate to an elevated temperature to crosslink the material of said second layer, forming the laminate into the form of a loop with said end portions being in lapping relationship to provide a lap joint, said lap joint being free of said second crosslinked layer, and solvent bonding said end portions together to provide a loop element.

2. The method of claim 1, and including the step of subjecting the loop element to a hydrolization treatment to thereby hydrolyze the exposed outer surface of said first and third layers to thereby increase the moisture sensitivity of the element.

3. The method of claim 2, wherein said hydrolyzation treatment is carried on at an elevated temperature, including the step of subjecting the loop element to tensile stress while said loop element is undergoing said hydrolyzation treatment to thereby provide a permanent elongated set for said loop eleemnt.

4. The method of claim 1, wherein said second layer is provided with a different color than said first and third layers so that said end portions are readily visible.

5. The method of claim 1, wherein said first and third layers are generally transparent and said second layer has a relatively dark color visible through said first and third layers.

6. The method of claim 1, wherein said core is the reaction product of a cellulosic material having glucoside chains and a monomer or partial polymer capable of reacting with the hydroxyl groups of said glucoside chains.

7. The method of claim 1, wherein said end portions are bonded together by applying a solvent for said moisture sensitive material to said end portions to soften said end portions, and thereafter pressing said end portions together.

8. A humidity sensing device, comprising a humidity sensing element having an endless loop configuration and comprising a central organic crosliked core and at least one moisture sensitive layer bonded to a surface of said core, said moisture sensitive layer extending continuously throughout the loop configuration and having end portions solvent bonded in overlapping relation to provide a lap joint said core being discontinuous with the ends of said core terminating adjacent said lap joint and said lap joint being free of said core, and support means connected to opposite portions of said loop for supporting the loop in tension.

9. The device of claim 8, wherein moisture sensitive layers are bonded to opposite surfaces of the core.

10. The device of claim 9, wherein said moisture sensitive layers are transparent and said core is colored.

11. The device of claim 8, wherein said core and said moisture sensitive layer have different colors.

12. The device of claim 8, wherein the moisture sensitive layer is a cellulose derivative, and said element includes an outer layer of cellulose bonded to the outer surface of said moisture sensitive layer.

13. The device of claim 8, wherein said core is the reaction product of a compound containing glucoside chains and a stabilizing monomer or partial polymer capable of crosslinking with the hydroxyl groups of said glucoside chains, and said moisture sensitive layer is selected from the group consisting of (a) a non-crosslinked compound containing glucoside chains, and (b) a partially crosslinked reaction product of a compound containing glucoside chains and a stabilizing monomer or partial polymer capable of crosslinking with the hydroxyl groups of said glucoside chains.

14. The device of claim 8, wherein said lap joint is disposed in engagement with said support means.

15. The device of claim 8, wherein said support means comprises a pair of spaced, generally rollers and said lap joint is disposed in engagement with one of said rollers.

References Cited

UNITED STATES PATENTS

| | | | |
|---|---|---|---|
| 2,604,423 | 7/1952 | Slotterbeck et al. | 73—337 |
| 3,301,057 | 1/1967 | Smith et al. | 73—337 |
| 3,368,755 | 2/1968 | Smith et al. | 73—337 |
| 3,434,348 | 3/1969 | Smith et al. | 73—337 |
| 3,440,881 | 4/1969 | Thoma | 73—337.5 |

LOUIS R. PRINCE, Primary Examiner

D. E. CORR, Assistant Examiner

UNITED STATES PATENT OFFICE
CERTIFICATE OF CORRECTION

Patent No. 3,534,608          Dated October 20, 1970

Inventor(s)  Paul E. Thoma and Jeannine O. Colla

It is certified that error appears in the above-identified patent and that said Letters Patent are hereby corrected as shown below:

Col. 1, line 25, After "sion" insert ---is---, Col. 6, line 23, Cancel "jont" and substitute therefor ---joint---, Col. 7, line 42, Cancel "eleemnt" and substitute therefor ---element---, Col. 8, line 12, After "joint" and before "said" insert a comma (,), Col. 8, line 41, After "generally" and before "rollers" insert ---parallel---.

SIGNED AND SEALED
MAR 2 1971

(SEAL)
Attest:

Edward M. Fletcher, Jr.
Attesting Officer

WILLIAM E. SCHUYLER, JR.
Commissioner of Patents